United States Patent
Åkerberg et al.

(10) Patent No.: US 12,231,287 B2
(45) Date of Patent: Feb. 18, 2025

(54) FAILURE HANDLING OF A TSN COMMUNICATION LINK

(71) Applicant: ABB Schweiz AG, Baden (CH)

(72) Inventors: Johan Åkerberg, Västerås (SE); Ravish Kumar, Bangalore (IN); Jörgen Gade, Västerås (SE); Rahul Nandkumar Gore, Satara (IN)

(73) Assignee: ABB Schweiz AG, Baden (CH)

( * ) Notice: Subject to any disclaimer, the term of this patent is extended or adjusted under 35 U.S.C. 154(b) by 490 days.

(21) Appl. No.: 17/419,963

(22) PCT Filed: Jan. 7, 2019

(86) PCT No.: PCT/EP2019/050235
§ 371 (c)(1),
(2) Date: Jun. 30, 2021

(87) PCT Pub. No.: WO2020/143900
PCT Pub. Date: Jul. 16, 2020

(65) Prior Publication Data
US 2022/0094588 A1 Mar. 24, 2022

(51) Int. Cl.
*H04L 41/0654* (2022.01)

(52) U.S. Cl.
CPC .............................. *H04L 41/0654* (2013.01)

(58) Field of Classification Search
CPC .. H04L 1/1854; H04L 47/801; H04L 65/4015
See application file for complete search history.

(56) References Cited

U.S. PATENT DOCUMENTS

| | | | |
|---|---|---|---|
| 2006/0218271 A1 | 9/2006 | Kasslin et al. | |
| 2017/0149639 A1 | 5/2017 | Vasseur et al. | |
| 2018/0084055 A1* | 3/2018 | Mong | B61L 15/0072 |
| 2018/0132234 A1* | 5/2018 | Cavalcanti | H04W 72/02 |
| 2018/0237039 A1 | 8/2018 | Mong et al. | |

(Continued)

FOREIGN PATENT DOCUMENTS

| | | |
|---|---|---|
| CN | 101854268 A | 10/2010 |
| CN | 108173755 A | 6/2018 |
| EP | 1608116 A1 | 12/2005 |

OTHER PUBLICATIONS https://www.iiconsortium.org/pdf/TSN-brochure-2017-11-7.pdf Time sensitive networking flexible manufacturing, pp. 1-4, 2017 (Year: 2017).*

(Continued)

*Primary Examiner* — Romani Ohri
(74) *Attorney, Agent, or Firm* — Whitmyer IP Group LLC

(57) ABSTRACT

A method for handling failure of a TSN communication link in a TSN network. The method is performed by a control node and includes estimating requirements for TSN communication for end-points based on application parameters, input/output requirements, and application requirements, wherein each end-point is capable of communicating over a TSN channel and a non-TSN channel in the TSN network using one and the same network interface. The method includes obtaining an indication of a failure of a TSN communication link in the TSN network between two of the end-points. The method includes performing self-healing of the TSN communication link.

28 Claims, 11 Drawing Sheets

(56) References Cited

U.S. PATENT DOCUMENTS

| | | | |
|---|---|---|---|
| 2018/0237040 A1 | 8/2018 | Mong et al. | |
| 2019/0322298 A1* | 10/2019 | Mong | B61L 23/005 |
| 2019/0322299 A1* | 10/2019 | Mong | B61L 15/0072 |
| 2020/0120536 A1* | 4/2020 | Prakash | H04W 72/21 |
| 2021/0227452 A1* | 7/2021 | Munz | H04W 76/10 |

OTHER PUBLICATIONS

Chinese Office Action and Search Report; Application No. 2019800875790; Issued Jun. 1, 2022; 14 Pages.

Finn, Norman; "TSN Control & Configuration"; Cisco Systems, tsn-nfinn-control-and-config-0515-v01.pdf, IEEE 802.1 plenary; Berlin, Germany; May 27, 2015; 28 Pages.

Nasrallah, Ahmed, et al.; "Ultra-Low Latency (ULL) Networks: A Comprehensive Survey Covering the IEEE TSN Standard and Related ULL Research"; Arxiv.Org, Cornell University Library, 201 Olin Library Cornell University Ithaca, NY 14853; Mar. 20, 2018; 60 Pages.

International Search Report and and Written Opinion of the International Searching Authority; Application No. PCT/EP2019/050235; Completed: Sep. 17, 2019; Mailing Date: Sep. 30, 2019; 19 Pages.

Omniran Task Group, of IEEE 802.1CF-2019; "IEEE Recommended Practice for Network Reference Model and Functional Description of IEEE 802(R) Access Network"; in IEEE Std 802.1CF-2019; NY, NY; May 31, 2019; 176 Pages.

Chen, Feng, et al.; "Resource Allocation Protocol (RAP) based on LRP for Distributed Configuration of Time-Sensitive Streams"; IEEE Draft, TSN-CHEN-RAP-WHITEPAPER-0917-V01, IEEE-SA, vol. 802, No. v01; Piscataway, NJ, USA; Sep. 7, 2017; 18 Pages.

Godfrey, Tim, et al.; "Utility Applications of Time Sensitive Networking White Paper"; IEEE Draft in Utility Applications of Time Sensitive Networking White Paper, vol. 802.24, No. 1; Piscataway, NJ, USA; Nov. 15, 2018; 16 Pages.

* cited by examiner

FAILURE HANDLING OF A TSN COMMUNICATION LINK

TECHNICAL FIELD

Embodiments presented herein relate to methods, control node, a computer program, and a computer program product for handling failure of a Time-Sensitive Networking (TSN) communication link in a TSN network.

BACKGROUND

TSN is an emerging standard aiming to enable Ethernet networks with real-time capabilities. TSN supports different traffic classes/priorities to coexist on the same network while guaranteeing deterministic end-to-end behavior. In the TSN systems two entities denoted Centralized User Configuration (CUC) entity and Centralized Network Configuration (CNC) entity are the active components for TSN configuration in the end-point devices (simply denoted as end-points for short) and the TSN network. Industrial automation devices such as controllers, Input/Output (I/O) devices, sensors, actuators, etc. have to make a request to the CNC entity via the CUC, entity or directly to the CNC entity for requesting TSN specific timeslots for transmission of messages in the TSN network. The CNC entity analyzes the request from the end-point and allocates a TSN time slot in the TSN network for communicating the messages. The CNC entity might configure the underlying TSN communication backbone components in such a way that the end-points achieve deterministic real time communication for their message exchange with other end-points. If any network bridge, or other intermediate device in the TSN network, fails to transmit/receive message within the allocated TSN time slot, then the message will not be transmitted to the destination end-point.

The standard IEEE 802.1AS rev2 specifies time synchronization specification for time synchronization among network bridges. The same standard can be used by the end-points for time-synchronization. Effective time synchronization among end-points is beneficial for time sensitive message exchange. It may happen that one end-point (denoted a listener) not able receive messages from another end-point (denoted a talker) because of time synchronization issues. Time synchronization issues either on the end-point side or the network side affects the real time communication between the end-points. An end-point may not even know whether itself has a problem or if it is the network or another end-point that has a problem.

Typically, detection of such communication failure and troubleshooting may require human intervention. If such problems occur frequently in multiple devices, it may affect the automation system operation. Since TSN network incorporates Operational Technologies (OT) and Informational Technologies (IT) into the same network, it requires efficient mechanisms to detect reason for communication failure autonomously by end points, and also requires automated workflow to perform troubleshooting.

SUMMARY

An object of embodiments herein is to provide efficient handling of a failure of a TSN communication link in the TSN network.

According to a first aspect there is presented a method for handling failure of a TSN communication link in a TSN network. The method is performed by a control node. The method comprises estimating requirements for TSN communication for end-points based on application parameters, input/output requirements, and application requirements, wherein each end-point is capable of communicating over a TSN channel and a non-TSN channel in the TSN network using one and the same network interface. The method comprises obtaining an indication of a failure of a TSN communication link in the TSN network between two of the end-points. The method comprises performing self-healing of the TSN communication link.

Advantageously this enables efficient handling of the failure of the TSN communication link in the TSN network.

According to a second aspect there is presented a control node for handling failure of a TSN communication link in a TSN network. The control node comprises processing circuitry. The processing circuitry is configured to cause the control node to estimate requirements for TSN communication for end-points based on application parameters, input/output requirements, and application requirements, wherein each end-point is capable of communicating over a TSN channel and a non-TSN channel in the TSN network using one and the same network interface. The processing circuitry is configured to cause the control node to obtain an indication of a failure of a TSN communication link in the TSN network between two of the end-points. The processing circuitry is configured to cause the control node to perform self-healing of the TSN communication link.

According to a third aspect there is presented a computer program for handling failure of a TSN communication link in a TSN network, the computer program comprising computer program code which, when run on processing circuitry of a control node, causes the control node to perform a method according to the first aspect.

According to a fourth aspect there is presented a method for handling failure of a TSN communication link in a TSN network. The TSN network comprises end-points and intermediate nodes. A TSN communication link extends between two of the end-points via a first subset of the intermediate nodes. At least one further TSN communication link extends between said two of the end-points via a second subset of the intermediate nodes. The first subset and the second subset are not identical. The method is performed by a control node. The method comprises obtaining an indication of a failure of the TSN communication link. The method comprises performing self-healing of the TSN communication link.

Advantageously this enables efficient handling of the failure of the TSN communication link in the TSN network.

According to a fifth aspect there is presented a control node for handling failure of a TSN communication link in a TSN network. The TSN network comprises end-points and intermediate nodes. A TSN communication link extends between two of the end-points via a first subset of the intermediate nodes. At least one further TSN communication link extends between said two of the end-points via a second subset of the intermediate nodes. The first subset and the second subset are not identical. The control node comprises processing circuitry. The processing circuitry is configured to cause the control node to obtain an indication of a failure of the TSN communication link. The processing circuitry is configured to cause the control node to perform self-healing of the TSN communication link.

According to a sixth aspect there is presented a computer program for handling failure of a TSN communication link in a TSN network, the computer program comprising computer program code which, when run on processing circuitry of a control node, causes the control node to perform a method according to the fourth aspect.

According to a seventh aspect there is presented a computer program product comprising a computer program according to at least one of the third aspect and the sixth aspect and a computer readable storage medium on which the computer program is stored. The computer readable storage medium could be a non-transitory computer readable storage medium.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
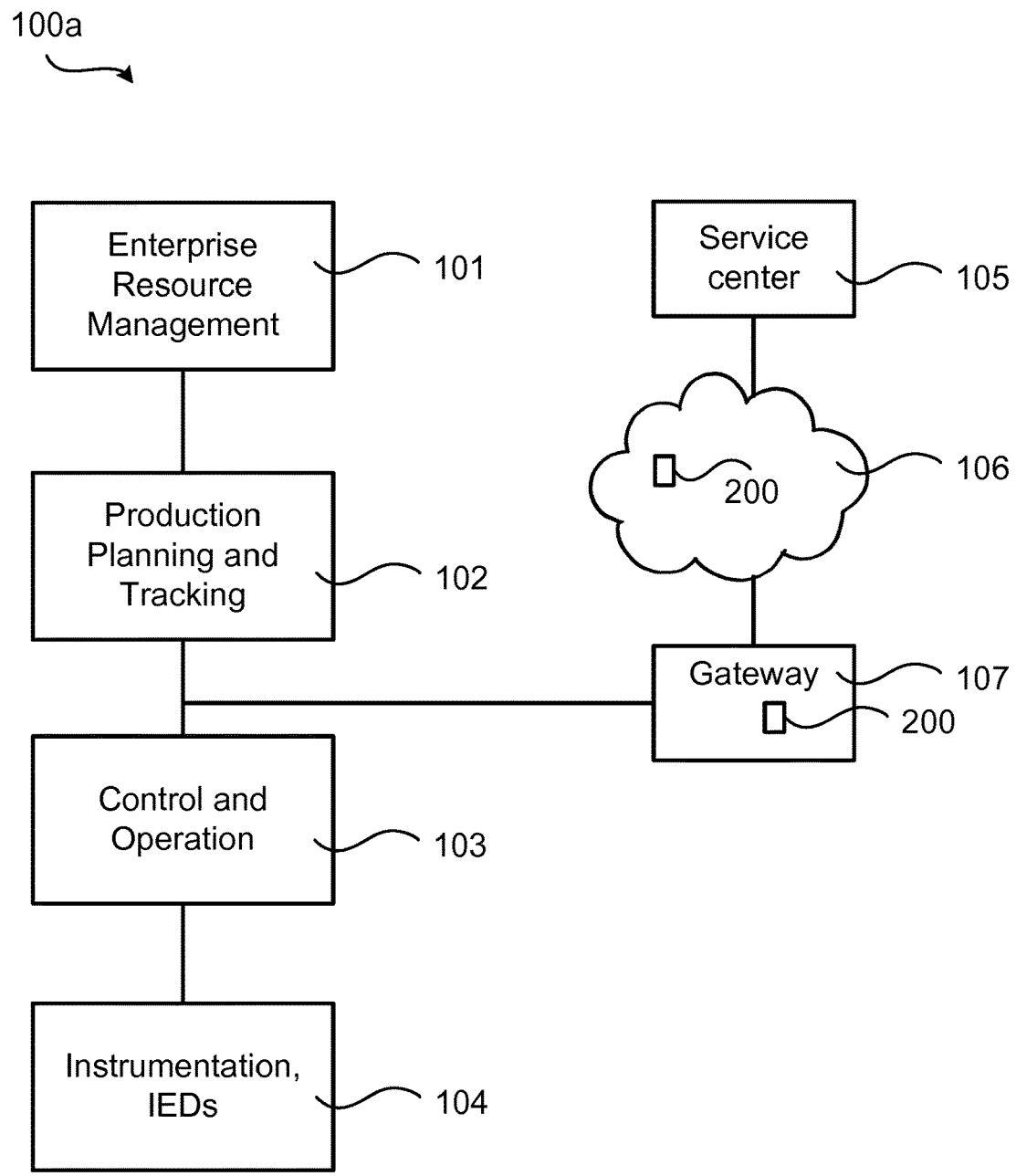
FIGS. 1, 2, 8, 9, and 10 are schematic diagrams illustrating an industrial system according to embodiments.

FIG. 1 is a schematic diagram illustrating an industrial system 100a where embodiments presented herein can be applied. The industrial system 100a comprises an enterprise resource management part 101, a production planning and tracking part 102 (which might comprise a Plant Information Management System (PIMS), a Collaborative Production Management (CPM) system, etc.), a control and operation part 103 (which might comprise a Distributed Control System (DCS), a Supervisory Control And Data Acquisition (SCADA) system, etc.), an instrumentation and Intelligent Electronic Devices (IEDs) part 104 (which might comprise measurement instruments, sensors, actuators, local and remote input/output interfaces, machines, tools, robots, etc.), a service center 104, a cloud computational environment 106 and a gateway 107. One or more of the parts 101-104 comprises end-points 120a-120N. Examples of end-points 120a-120N will be given below. As will be further disclosed with reference to FIG. 2, the parts 101-104 in general, and the end-points 120a-120N in particular, are configured to communicate with each other (as well as with the service center 105) over a network. A control node 200 is provided in the gateway 107 and/or in the cloud computational environment 106.

Figure 2:
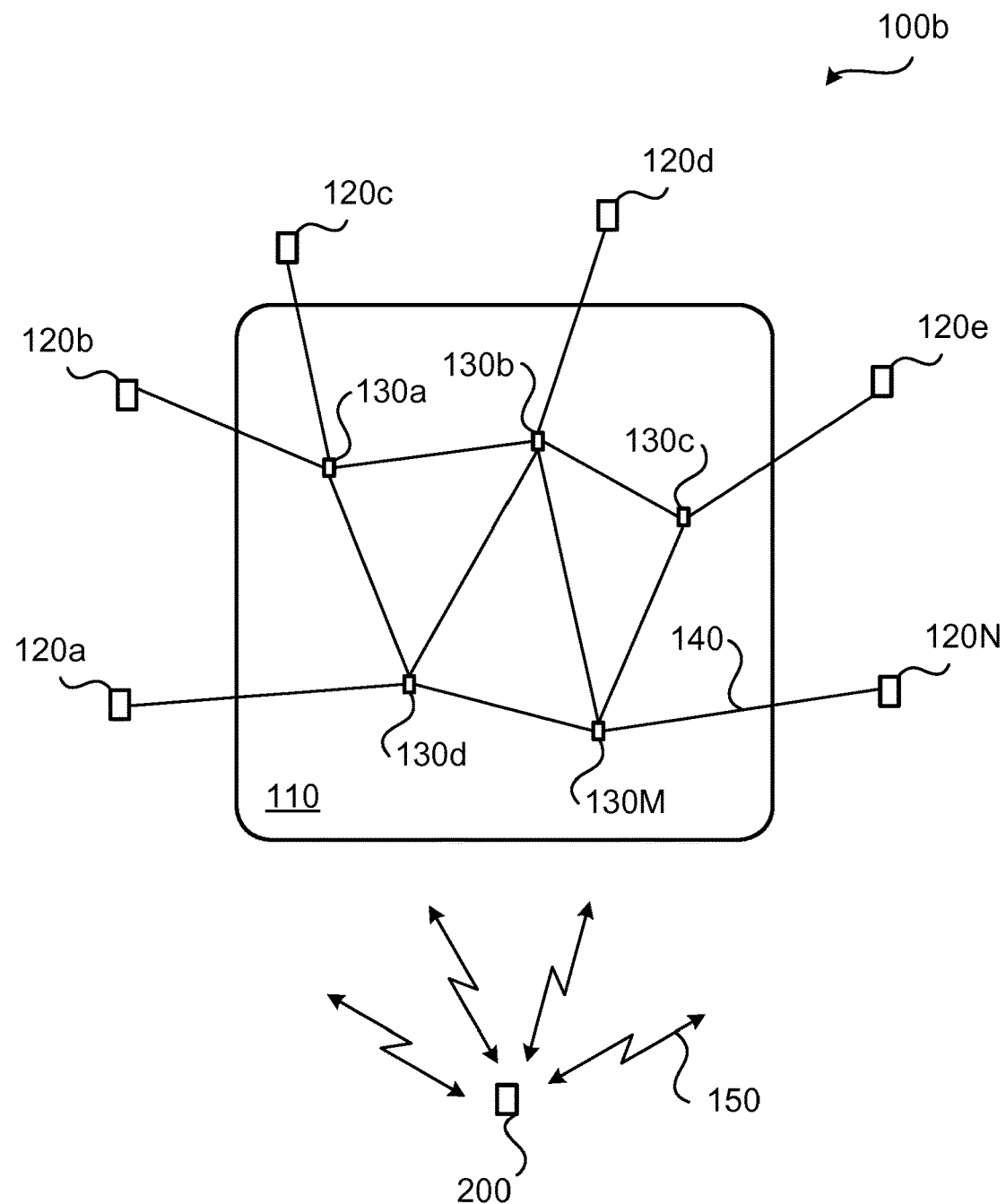

FIG. 2 is a schematic diagram illustrating an industrial system 100b where embodiments presented herein can be applied. FIG. 2 might be regarded as providing another perspective of the industrial system 100a of FIG. 1. In FIG. 2 the industrial system 100a of FIG. 1 is represented by its end-points 120a-120N and the network over which the end-points 120a-120N are configured to communicate. These end-points 120a-120N might be part of any of the parts 101-104 in FIG. 1 and the network might thus extend between two or more of the parts 101-104 in FIG. 1 as needed in order to enable the end-points 120a-120N to communicate with each other (as well as with the service center).

The industrial system 100b thus comprises end-points 120a, 120b, 120c, 120d, 120e, 120N and a network 110. There may be different examples of end-points 120a-120N. In some examples the end-points 120a-120N are industrial plant equipment. Non-limiting examples of industrial plant equipment are sensors, actuators, controllers, human machine interfaces (HMIs), engineering tools, cameras, and the like. The end-points 120a-120N might be required to operate, and communicate with each other, in real-time in order for the industrial system 100a, 100b to operate properly. Hence, the end-points 120a-120N might be referred to as real-time operating end-points 120a-120N. In some examples the end-points 120a-120N are part of a networked embedded system. Thus, in some examples the industrial system 100a, 100b is a networked embedded system. Further, the networked embedded system might be a distributed control system for controlling an industrial plant or process.

In turn, the network 110 comprises intermediate nodes 130a, 130b, 130c, 130d, 130M, such as network bridges, switches, routers, or gateways. The intermediate nodes 130a-130M are configured to route packets in the network 110 and thereby enable end-points 120a-120N to communicate with each other over communication links 140. The communication links 140 are wired. That is, in some aspects each communication link is a wired communication link. The end-points 120a-120N and the control node 200 are configured to communicate with each other over communication links 150. In some embodiments the network 110 is a TSN network 110 and hence the communication links 140 are TSN communication links 140. In some examples at least some of the end-points 120a-120N are TSN-aware and thus configured, or otherwise enabled, for operation in a TSN network 110.

The embodiments disclosed herein relate to mechanisms for handling failure of a TSN communication link 140 in a TSN network 110. In order to obtain such mechanisms there is provided a control node 200, a method performed by the control node 200, a computer program product comprising code, for example in the form of a computer program, that when run on a control node 200, causes the control node 200 to perform the method.

The real time deterministic communication between two end-points 120a-120N in a network might fail because of many reasons. Some examples are due to a clock synchronization issue between the end-points 120a-120N or clock synchronization issues among underlying network bridges or other types of intermediate nodes 130a-130M in the TSN network 110, etc. Typically, real time deterministic communication failure between end-points 120a-120N does not allow the end-points 120a-120N to convey their status related to the communication failure. The end-points 120a-120N are instead supposed to stop their operation or change their state to a safe mode operation. Fixing of real time communication failure may require human intervention.

Unlike traditional real time deterministic communication approach (such as EtherCAT, Profinet, etc.), the TSN standard provides flexible configuration settings. The TSN standards communication backbone typically supports four kinds of communication traffic classes in the network. These are "best effort traffic", "priority traffic", "stream reservation traffic", and "scheduled traffic". "Stream Reservation" and "Scheduled traffic" are new addition of IEEE TSN in the existing IEEE 802.1 standard. "Scheduled traffic" is used for time sensitive real time deterministic communication. IEEE 802.1AS Rev2 defines time synchronization profiles for network bridge time synchronization. The transmission and reception gates of network bridges are time synchronized in such a manner that time sensitive traffic ideally passes through all the network bridges' gate without any waiting queue. IEEE TSN communication backbone reserves bandwidth for the different traffic classes separately. Therefore, the same communication backbone can be used for TSN and non-TSN traffic simultaneously.

According to the embodiments disclosed herein there are proposed mechanisms for handling TSN communication failure between end-points 120a-120N acting as talkers and listeners. A control node 200 might estimate TSN communication traffic between the end-points 120a-120N. Each end-point is provisioned with a non-TSN communication port which uses non-TSN communication for communicating with the control node 200 and non-TSN communication ports for other end-points 120a-120N. In case of TSN communication failure, the end-points 120a-120N use their non-TSN communication port to initiate communication with the control node 200 and other end-points 120a-120N to perform the self-healing operation autonomously.

Figure 3:
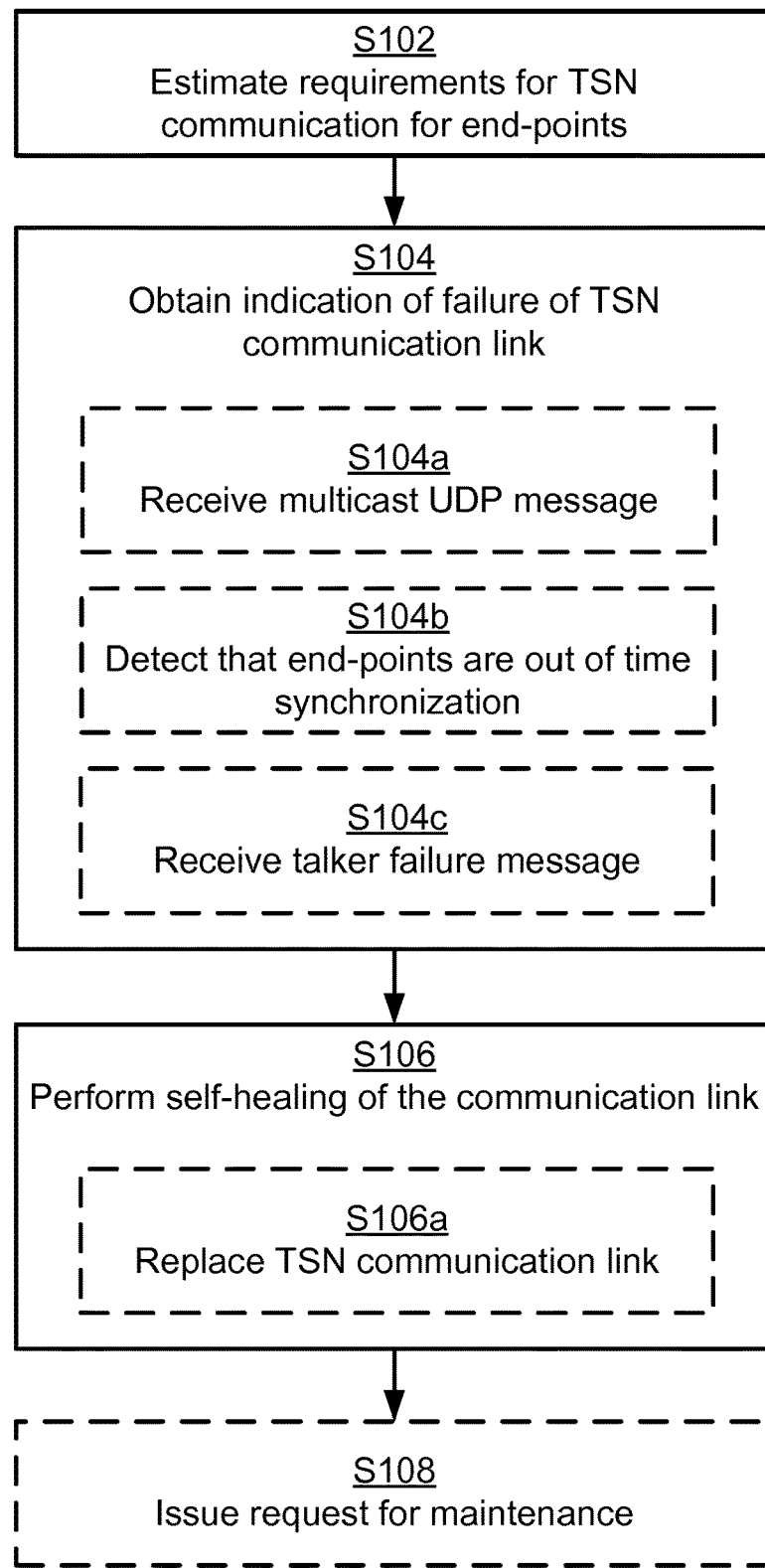
FIGS. 3, 4, 5, 6 and 7 are flowcharts of methods according to embodiments.

FIG. 3 is a flowchart illustrating embodiments of methods for handling failure of a TSN communication link 140 in a TSN network 110. The methods are performed by the control node 200. The methods are advantageously provided as computer programs 1320.

S102: The control node 200 estimates requirements for TSN communication for end-points 120a-120N based on application parameters, input/output requirements, and application requirements. Each end-point is capable of communicating over a TSN channel and a non-TSN channel in the TSN network 110 using one and the same network interface. Step S102 might thus involve performing at least some of the above disclosed first phase and second phase. As disclosed above, each end-point 120a-120N might comprise a TSN communication port for TSN communication in the TSN network 110 and a non-TSN communication port for non-TSN communication in the TSN network 110.

S104: The control node 200 obtains an indication of a failure of a TSN communication link 140 in the TSN network 110 between two of the end-points 120a-120N.

S106: The control node 200 performs self-healing of the TSN communication link 140.

Embodiments relating to further details of handling failure of a TSN communication link 140 in a TSN network 110 as performed by the network node 200 will now be disclosed.

Failure of the TSN communication link 140 might be detected in intelligent network entities (such as in any of the intermediate nodes 130a-130M, the end-points 120a-120N, the control node 200, the CUC entity, and/or the CNC entity). Initiatives to mitigate failure can come from anywhere in the TSN network 110 where consciousness about the failure exists (instead of only relying on the CNC entity that might react too slowly). The self-healing might result in a request to the CNC entity for new network configuration.

There may be different ways to perform the estimation in step S102. In some examples process parameters are tagged for TSN based communication and non-TSN based communication during the estimation in step S102. In some examples the process parameters are tagged with application layer protocol information during the estimation in step S102. In some examples the required TSN communication traffic for each end-point 120a-120N is estimated during the estimation in step S102.

There may be different ways to obtain the indication in step S104. Embodiments relating thereto will now be disclosed.

In some aspects, when an end-point 120a-120N acting as listener detects that there is no reception of packets from an end-point acting as a talker, the listener activates the non-TSN communication port and starts sending a multicast User Datagram Protocol (UDP) message. The multicast UDP message is sent to a group of members, including the control node 200, talkers, and listeners, in the TSN network 110. Hence, according to an embodiment the control node 200 is configured to perform (optional) step S104a as part of obtaining the indication in step S104:

S104a: The control node 200 receives, from the non-TSN communication port of one of the end-points 120a-120N acting as listener, a multicast UDP message. The message indicates that the end-point acting as listener has detected that there is no reception of packets from one of the end-points 120a-120N acting as a talker.

In some aspects, the indication is obtained by detecting any possible loss of time synchronization. In particular, according to an embodiment the control node 200 is configured to perform (optional) step S104b as part of step S104:

S104b: The control node 200 detects that the end-points 120a-120N are out of time synchronization with respect to each other.

In some aspects, when there is a problem with a talker application, all listeners will activate the non-TSN communication port and send a talker failure message to the group of members. Hence, according to an embodiment the control node 200 is configured to perform (optional) step S104c as part of step S104:

S104c: The control node 200 receives, from the non-TSN communication port of one of the end-points 120a-120N acting as listener, a talker failure message. The talker failure message indicates impairment of an application at one of the end-points 120a-120N acting as a talker.

In some examples, as a result of the detection in step S104, the non-TSN communication port is deactivated when TSN communication occurs.

There may be different ways to perform the self-healing in step S106. Embodiments relating thereto will now be disclosed.

In some aspects the talker reports to the control node 200 acting as CUC entity. That is, according to an embodiment, during the self-healing, the control node 200 acts as a CUC entity in the TSN network 110.

In some aspects the CUC entity is together with at least one CNC entity configured to, as part of performing the self-healing, coordinate and resolve the failure of the TSN communication link 140. That is, according to an embodiment the control node 200 is configured to, during the self-healing, communicate with at least one CNC entity for coordinating and resolving the failure of the TSN communication link 140.

As disclosed above with reference to the example in FIG. 2, in some aspects the TSN network 110 further comprises intermediate nodes 130a-130M. The TSN communication link 140 then extends between two of the end-points 120a-120N via a first subset of the intermediate nodes 130a-130M. Further, in some aspects at least one further TSN communication link 140 extends between the two end-points 120a-120N via a second subset of the intermediate nodes 130a-130M. The first subset and the second subset are not identical. This enables packets communicated between the two end-points 120a-120N to take different routes in the TSN network 110.

As will be further disclosed below with reference to FIG. 8, according to an embodiment duplicated packets are communicated between the two end-points 120a-120N on the TSN communication link 140 and on the at least one further TSN communication link 140. According to this embodiment, the control node 200 is configured to perform (optional) step S106a as part of performing the self-healing in step S106:

S106a: The control node 200 replaces the TSN communication link 140 with yet a further TSN communication link 140 extending between the two end-points 120a-120N via a third subset of the intermediate nodes 130a-130M. The third subset is neither identical to the first subset not identical to the second subset.

As will be further disclosed below with reference to FIG. 9, according to an embodiment, packets are communicated between the two end-points 120a-120N on the TSN communication link 140 before the failure of the TSN communication link 140 is detected in step S104, and, during the self-healing in step S106, the packets are instead communicated between the two end-points 120a-120N on the at least one further TSN communication link 140.

As will be further disclosed below with reference to FIG. 10, according to an embodiment respective non-duplicated packets are communicated between the two end-points 120a-120N on each of the TSN communication link 140 and the at least one further TSN communication link 140 before the failure of the TSN communication link 140 is detected in step S104. Then, during the self-healing in step S106, the packets communicated between the two end-points 120a-120N on the TSN communication link 140 for which failure has been detected in step S104 are dropped. This enables implicit self-healing.

There may be different ways for the control to act once having detected the failure of the TSN communication link 140 and/or once having performed the self-healing. In some aspects service request with instructions regarding what maintenance is needed to restore the lost system functionality is sent. Hence, according to an embodiment the control node 200 is configured to perform step S108:

S108: The control node 200 issues a request for a maintenance service of the TSN communication link 140.

In general terms, TSN enabled industrial end-points 120a-120N might go through a number of phases, where the first phase is a configuration phase. In this phase a control node 200 of the TSN network 110 configures the end-points 120a-120N. In general terms, there are two kinds of communication parameters to be configured. The first type of communication parameters is non-TSN communication parameters, and the second type of communication parameters is TSN communication parameters.

TSN enabled industrial end-points 120a-120N may be configured with different functionalities. Some functions are related to configuration, firmware updating, diagnostics, executing control functions, etc. For each of these functionalities, the end-points 120a-120N are required to communicate with other applications or devices over the TSN network 110. However, a real time deterministic communication is not required for data exchange for all these functionalities. Traditional best effort communication would be sufficient for some. Therefore, for efficient utilization of the communication bandwidth in the TSN network 110, critical process parameters might be selected that need to have real time communication for TSN based communication in the TSN network 110, and the other remaining communications can be configured for non-TSN based communication in the TSN network 110. Therefore, the control node 200 might be configured to estimate data for the TSN based communication and data for the non-TSN based communication for a given end-point 120a-120N, and hence to estimate the total amount of TSN traffic. The following approach can be taken for estimating the TSN traffic. The total amount of application data transmission at given time t can be written as:

$$N_T = \Sigma_{k=1}^{Q} 1/T_{Fk}(\Sigma P_n S_n + Ah_{pk} + Dh) \quad (1)$$

Where, $P_n$=Parameter of device, where, n=1≤M, M is maximum number of parameters $S_n$=Size of each parameters in bytes $T_{Fk}$=Average data update rate of device function, in sec $Ah_k$=Average size of application layer protocol headers Dh=Data link header packet $N_T$=Total data transmission rate at t.

The estimated TSN traffic for the end-point can be written as:

$$N_{T\_tsn} = \Sigma_{k=1}^{Q} 1/T_{Fk}(\Sigma P_{n\_tsn} S_{n\_tsb} + Ah_k + Dh) \quad (2)$$

Figure 4:
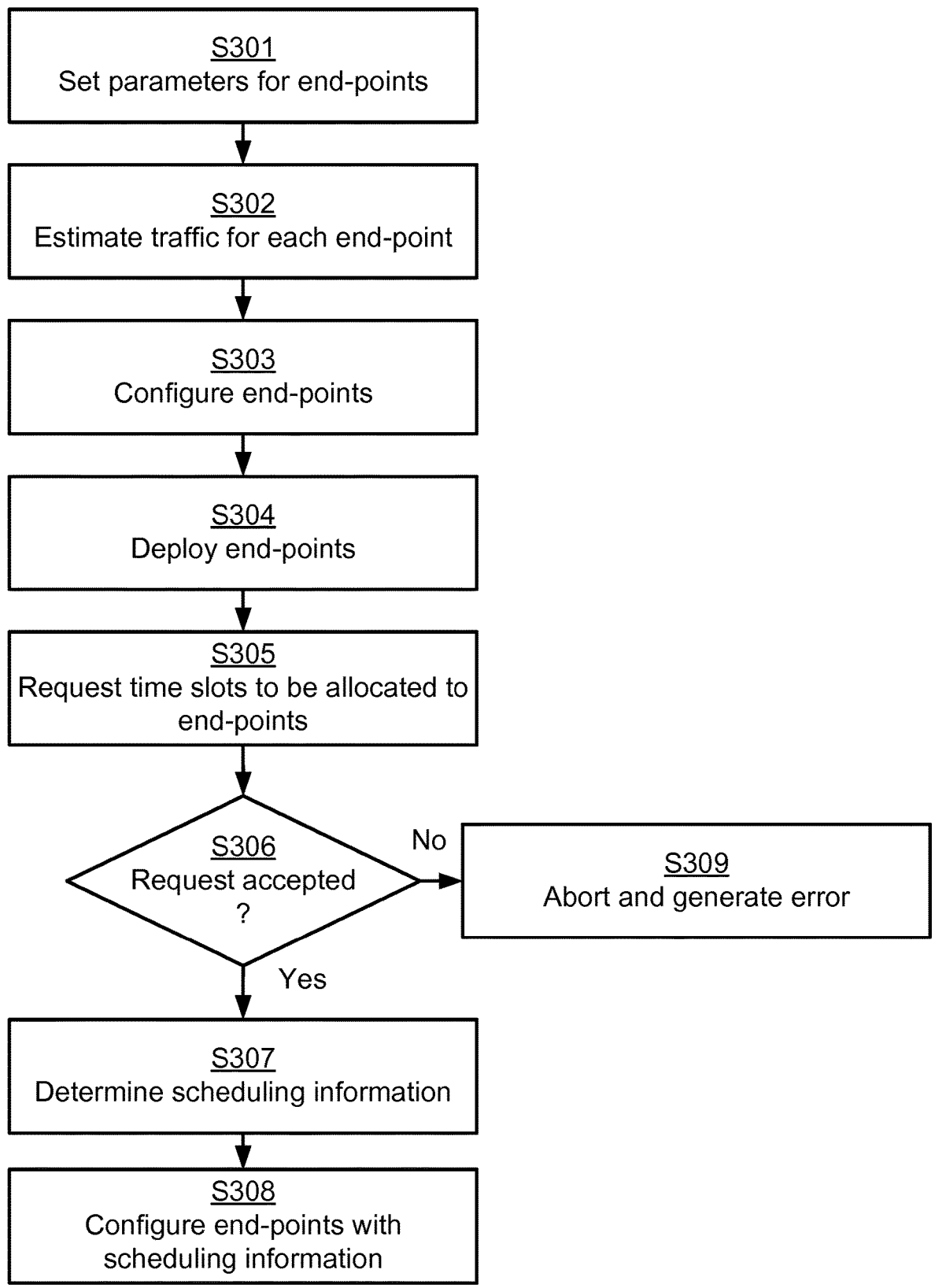

Where, $N_{T\_tsn}$=Estimated TSN data transmission rate at t time $P_{n\_tsn}$=Parameters that to be exchanged with TSN communication channel $S_{n\_tsb}$=Size of each parameters in bytes FIG. 4 is a flowchart of an embodiment for configuring end-points 120a-120N with parameters.

S301: Application parameters, input/output requirements, application requirements, etc. are set for the end-points 120a-120N.

S302: The needed TSN traffic for each end-point 120a-120N is estimated based on the parameters set in step S301.

S303: The end-points 120a-120N are configured with the parameters set in step S301 as well as with parameters for both TSN communication and non-TSN communication.

S304: The end-points 120a-120N are deployed and operatively connected to the TSN network 110.

S305: Scheduling of time slots to be allocated to the end-points 120a-120N for communication in the TSN network 110 is requested.

S306: If the request is accepted, step S307 is entered. If the request is not accepted, step S309 is entered.

S307: The scheduling of time slots is determined.

S308: The end-points 120a-120N are configured with the scheduling information.

S309: The procedure is aborted and an error (such as in the form of an error message) is generated.

The second phase is the configuration validation phase, after successful completion of the first phase. The end-point is deployed in the TSN network 110 and operatively connected to intermediate nodes 130a-130M, such as network bridges, in the TSN network 110. After deployment, the end-point might perform a configuration validation test to validate the TSN configuration. The end-point might have at least two communication ports. A first port is for TSN communication, and a second port is for non-TSN communication. The second port is referred to as TSN Diagnostic Port (TDP). The TDP is used for communicating with the control node 200 and TDP ports of other end-points 120a-120N.

Figure 5:
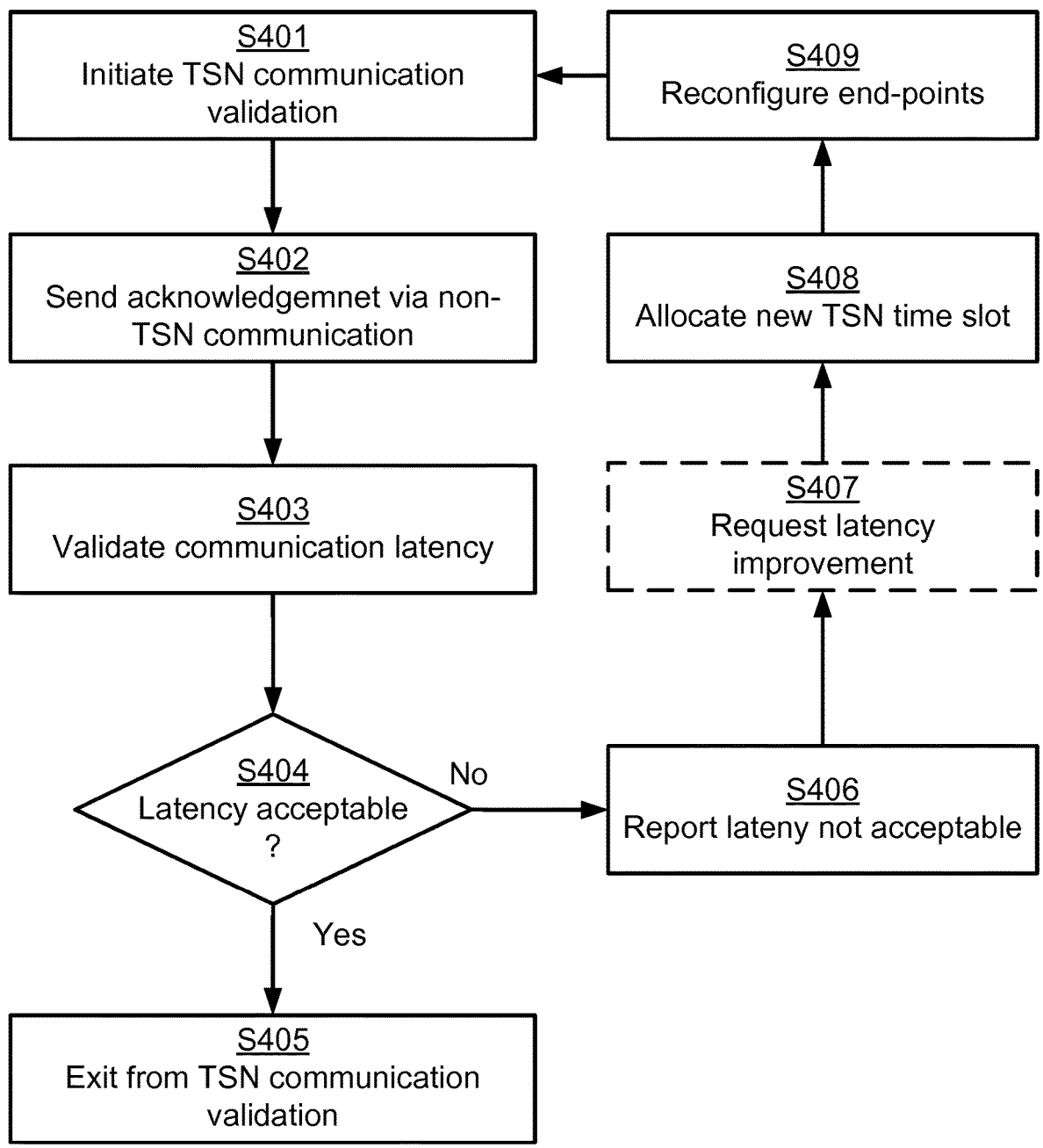
Figure 6:
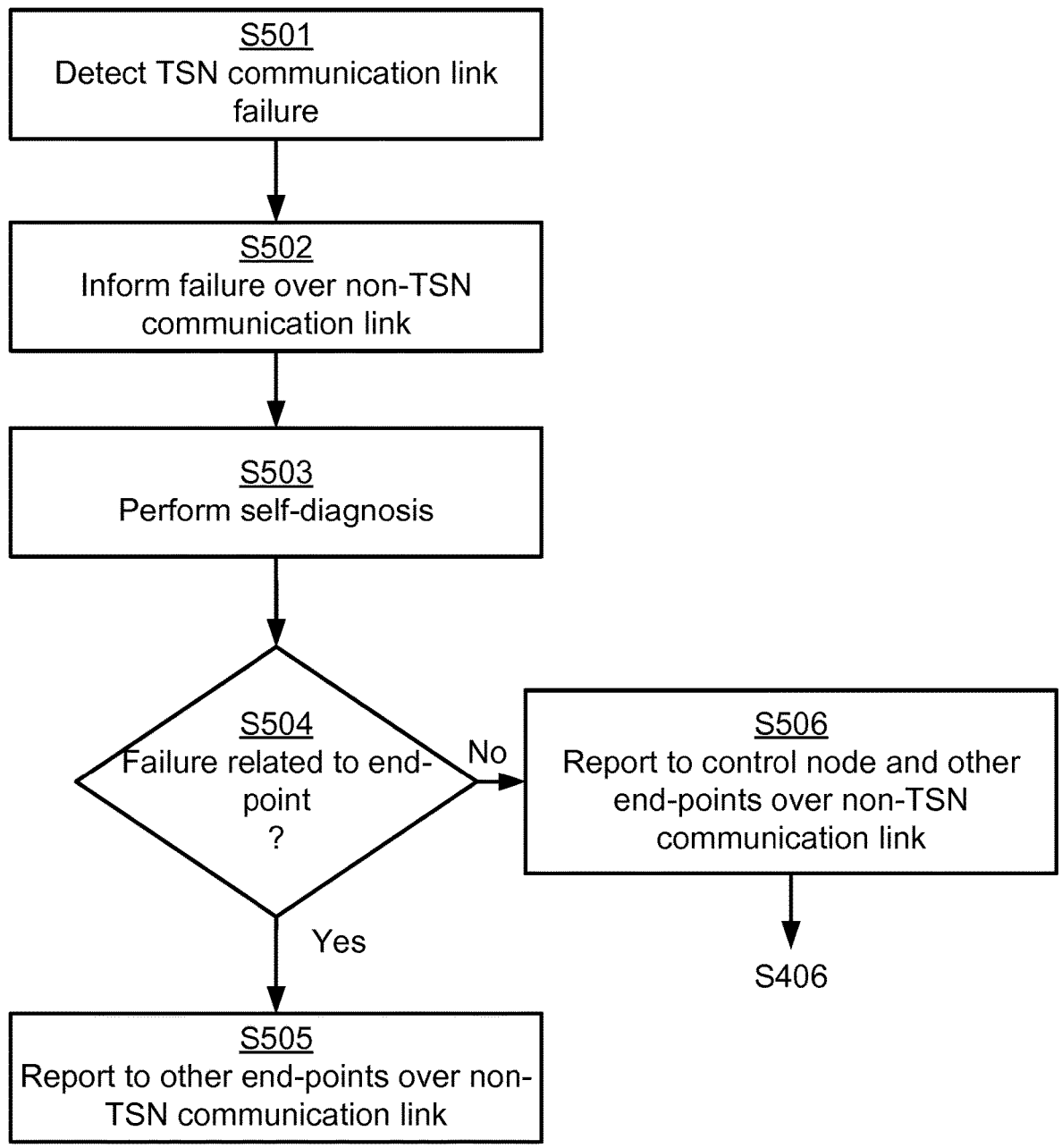

FIG. 5 and FIG. 6 are flowcharts of an embodiment for the configuration validation phase.

S401: An end-point 120a-120N acting as talker initiates a TSN communication validation procedure by sending simulated packet to other end-points in the TSN network 110 using TSN communication.

S402: One or more end-points 120a-120N acting as listener, upon successful reception of the simulated packet using TSN communication, responds with an acknowledgement message using non-TSN communication to the end-point 120a-120N acting as talker. The acknowledgement message comprises communication latency information of the TSN communication.

S403: The end-point 120a-120N acting as talker validates the communication latency for the TSN communication.

S404: If the communication latency is acceptable, step S405 is entered. If the communication latency is not acceptable, step S406 is entered.

S405: The end-point 120a-120N acting as talker and the one or more end-points 120a-120N acting as listener exit the TSN communication validation procedure.

S406: The end-point 120a-120N acting as talker reports to the control node 200 that the communication latency is not acceptable.

S407: Latency improvement is requested by the control node 200 (in case the control node 200 itself is not responsible for scheduling time slots to be allocated to the end-points for communication in the TSN network no).

S408: One or more time slots are allocated to the end-point 120a-120N acting as talker.

S409: The end-points 120a-120N are reconfigured based on the new one or more time slots having been allocated to the end-point acting as talker. Step S401 is then entered again.

S501: An end-point 120a-120N acting as listener detects failure of a TSN communication link 140 in the TSN network 110, for example by lack of reception of a scheduled message from an end-point 120a-120N acting as talker.

S502: The end-point 120a-120N acting as listener informs the end-point 120a-120N acting as talker of the failure over a non-TSN communication link.

S503: The end-point 120a-120N acting as listener and the end-point 120a-120N acting as talker each performs self-diagnosis in order to determine whether the failure is caused by, or relates to, one of the end-points 120a-120N.

S504: If determined that the failure is caused by, or relates to, one of the end-points, 120a-120N step S505 is entered. If determined that the failure is not caused by, or relates to, one of the end-points 120a-120N, step S506 is entered.

S505: At least one of the end-point 120a-120N acting as listener and the end-point 120a-120N acting as talker reports the failure to other end-points 120a-120N in the TSN network 110 over a non-TSN communication link.

S506: At least one of the end-point 120a-120N acting as listener and the end-point 120a-120N acting as talker reports the failure to the control node 200 as well as to other end-points 120a-120N in the TSN network 110 over a non-TSN communication link Step S406 might then be entered again.

Any of steps S301-S507 might be combined with steps S102-S108 and/or S202-S206 (where steps S202-S206 will be disclosed below).

Figure 7:
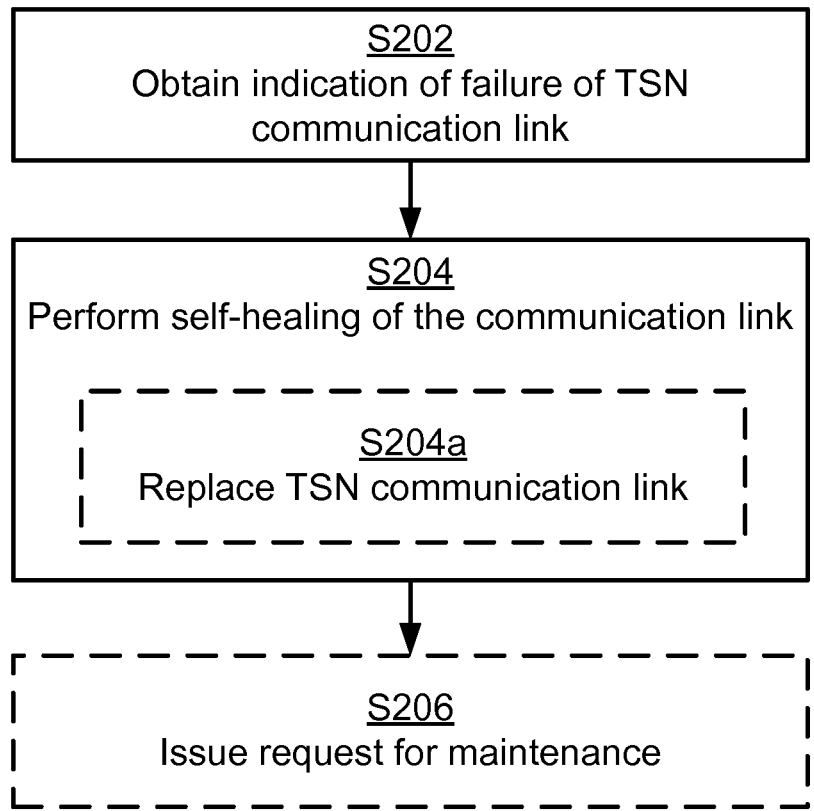

Further aspects of the self-healing, and in particular related to automatic recovery of redundancy functionality in a TSN network 110, will now be disclosed. FIG. 7 is a flowchart illustrating further embodiments of methods for handling failure of a TSN communication link 140 in a TSN network 110. The methods are performed by the control node 200. The methods are advantageously provided as computer programs 1320.

In these embodiments the TSN network 110 comprises end-points 120a-120N and intermediate nodes 130a-130M. A TSN communication link 140 extends between two of the end-points 120a-120N via a first subset of the intermediate nodes 130a-130M, and at least one further TSN communication link 140 extends between the two end-points 120a-120N via a second subset of the intermediate nodes 130a-130M, and the first subset and the second subset are not identical.

S202: The control node 200 obtains an indication of a failure of the TSN communication link 140. Any of the above embodiments relating to obtaining an indication of the TSN communication link 140 are applicable.

S204: The control node 200 performs self-healing of the TSN communication link 140.

Embodiments relating to further details of handling failure of a TSN communication link 140 in a TSN network 110 as performed by the network node will now be disclosed.

Self-healing might be automatically executed as a response to a failure of the TSN communication link 140. A distinction is here made between:

$MTTR_{logical}$—The Mean Time To Repair by automatic self-healing (that might involve network reconfiguration). Typically requires seconds or minutes for completion.

$MTTR_{physical}$—The Mean Time To Repair by replacing failed physical components. Typically requires hours or days for completion.

From a system level point of view, availability is improved by high MTBF (Mean Time Between Failure) and low MTTR, no matter if MTTR is in the form of an $MTTR_{logical}$ or an $MTTR_{physical}$ action.

Hereinafter will be disclosed means for increased availability by exploring not only $MTTR_{physical}$ actions, but also by automatically exploring $MTTR_{logical}$ actions in the TSN network 110.

There may be different ways to perform the self-healing of the TSN communication link 140 in step S204. Different embodiments relating thereto will now be described in turn.

Figure 8:
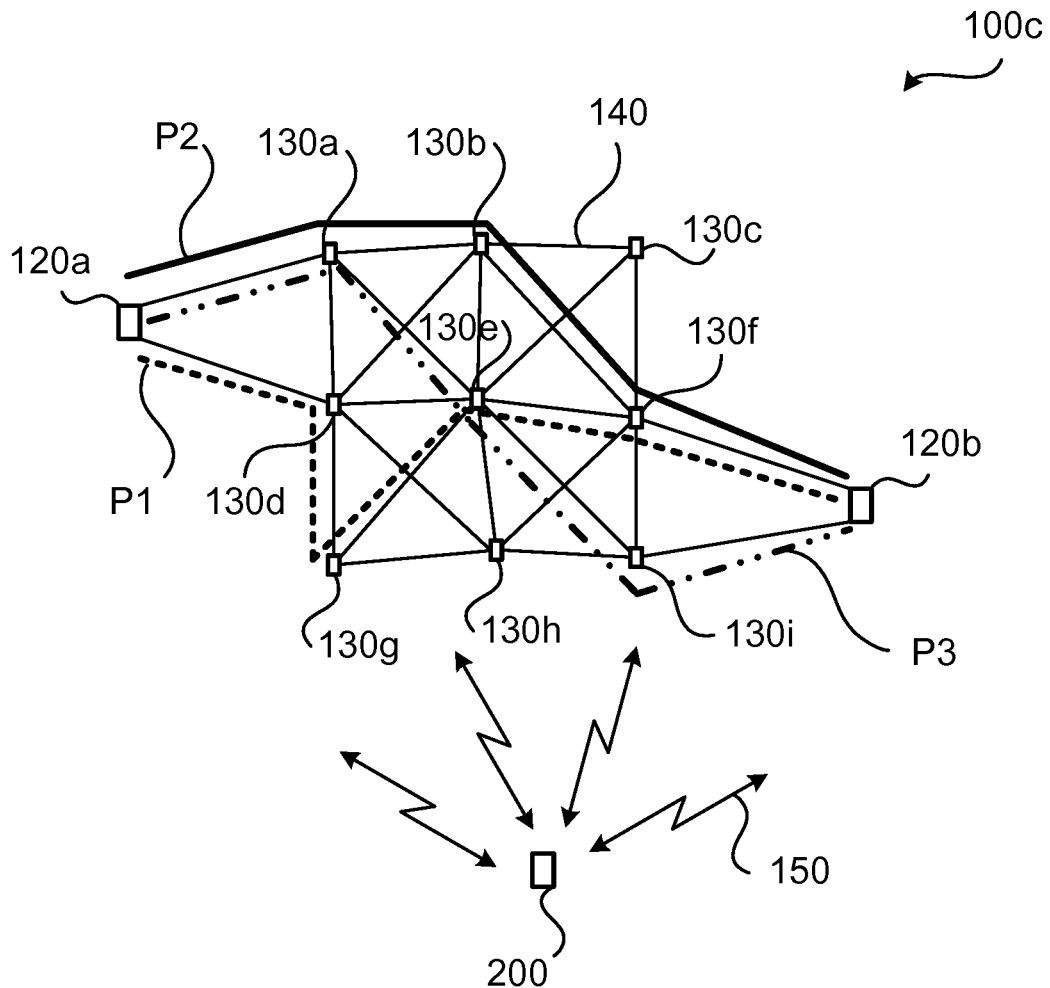
Figure 8:
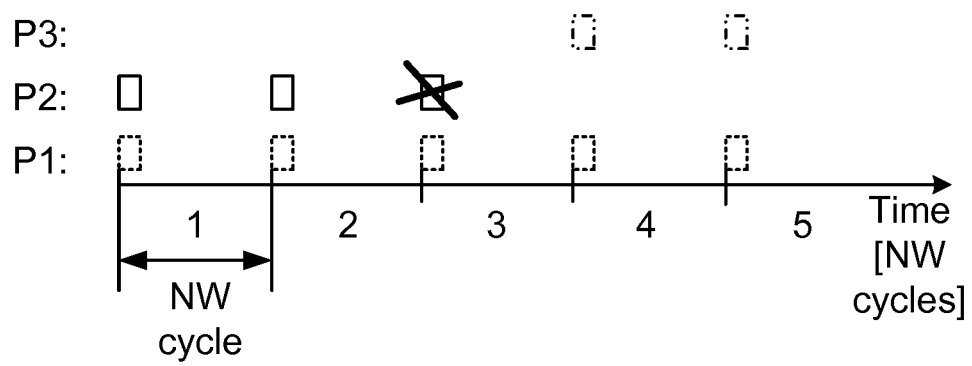

A first embodiment concerns automatic recovery of redundant TSN traffic streams according to IEEE 802.1CB and is illustrated in FIG. 8. FIG. 8 is a schematic diagram illustrating an industrial system 100c similar to that of FIG. 2 and comprises two end-points 120a, 120b, nine intermediate nodes 130a-130i, and one control node 200 configured to communicate with each other over TSN communication links 140 and communication links 150. The end-points 120*a*, 120*b* communicate with each other over paths P1, P2, P3, where during the first two network cycles packets are successfully communicated over paths P1 and P2, where during the third network cycle there is a failure at intermediate node 103*b* causing the packet communicated over path P2 to not be delivered (as indicated by the crossed-over packet in the bottom part of FIG. 8), and where in response thereto during the last two network cycles packets are instead communicated over paths P1 and P3. In the illustrative example of FIG. 8, path P1 extends between the two end-points 120*a*, 120*b* via the intermediate nodes 130*d*, 130*g*, 130*e*, 130*f*. In this respect, a configuration of using dual TSN communication links 140 enables significant time to be used to detect failure and to have the CNC to find a new redundant TSN communication link 140 while still having a fully operational system. In particularly, according to the first embodiment, duplicated packets are communicated between two of the end-points 120*a*-120N on the TSN communication link 140 and on the at least one further TSN communication link 140. According to this embodiment, the control node 200 is configured to perform (optional) step S204*a* as part of performing the self-healing in step S204:

S204*a*: The control node 200 replaces the TSN communication link 140 with a still further TSN communication link 140 extending between the two end-points 120*a*-120N via a third subset of the intermediate nodes 130*a*-130M. The third subset is neither identical to the first subset nor identical to the second subset.

Advantageously this first embodiment results in shorter MTTR$_{logical}$ in relation to just MTTR$_{physical}$ which solely relies on human intervention to restore the lost redundancy (replacing failed hardware causing the failure of the TSN communication link 140, that may or may not be on stock for replacement).

Figure 9:
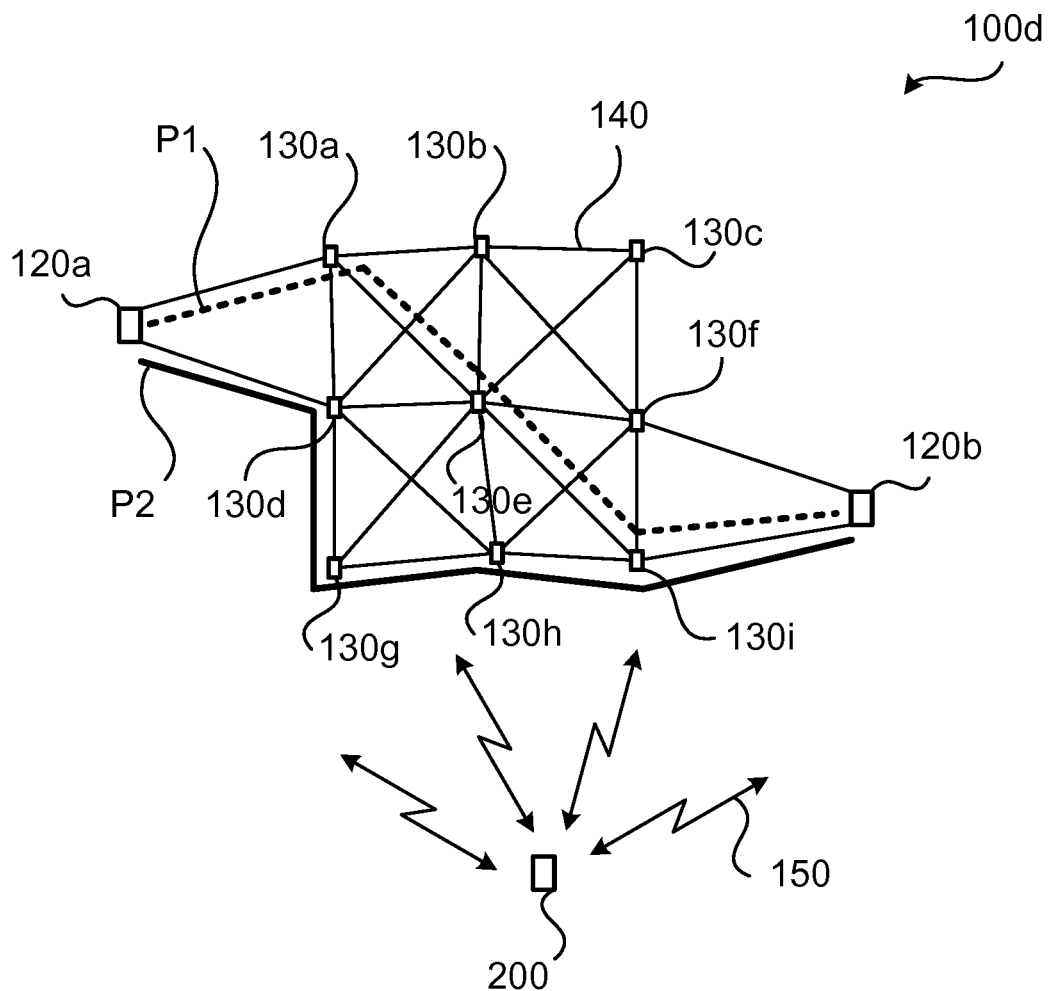
Figure 9:
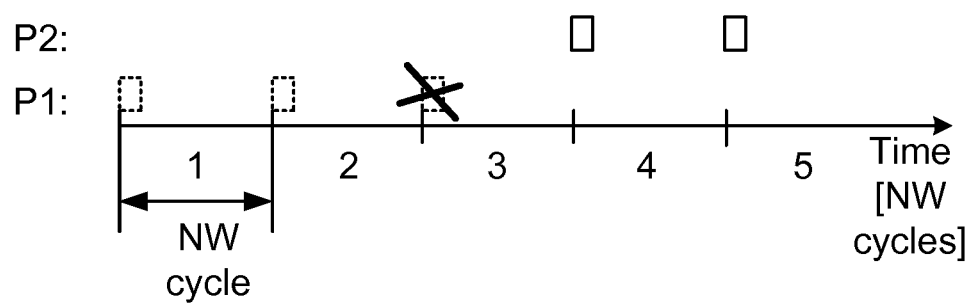

A second embodiment concerns automatic recovery for non-redundant TSN streams and is illustrated in FIG. 9. FIG. 9 is a schematic diagram illustrating an industrial system mod similar to that of FIG. 2 and comprises two end-points 120*a*, 120*b*, nine intermediate nodes 130*a*-130*i*, and one control node 200 configured to communicate with each other over TSN communication links 140 and communication links 150. The end-points 120*a*, 120*b* communicate with each other over paths P1, P2, where during the first two network cycles packets are successfully communicated over path P1, where during the third network cycle there is a failure at intermediate node 130*e* causing the packet communicated over path P1 to not be delivered (as indicated by the crossed-over packet in the bottom part of FIG. 9), and where in response thereto during the last two network cycles packets are instead communicated over path P2. In this respect, a TSN communication link 140 failure activates, after several consecutive errors, an in advance deployed redundant alternative TSN communication link 140 configuration to replace the failed TSN communication link 140 before the system enters fail-safe mode. In particular, according to the second embodiment, packets are communicated between the two end-points 120*a*-120N on the TSN communication link 140 before the failure of the TSN communication link 140 is detected in step S202, and, during the self-healing in step S204, the packets are instead communicated between the two end-points 120*a*-120N on the at least one further TSN communication link 140.

This is an alternative to IEEE 802.1CB behavior that does not consume any extra bandwidth (since transmission of duplicated packets is not required). Instead, the network node is capable of immediately swapping, using distributed error detection, from one TSN communication link 140 to another. This is advantageous since applications using TSN talkers and listener are enabled to handle loss of several packets consecutively without any serious system malfunction. Advantageously, this second embodiment can seamlessly allocate network bandwidth from especially the best effort queue where no guarantees apply to an alternative TSN communication link 140. The bandwidth for the original TSN communication link 140 is deallocated such that it is available for best effort traffic. This means that this swap from original TSN communication link 140 to an alternative TSN communication link 140 does not consume any more bandwidth from the best effort queue.

Figure 10:
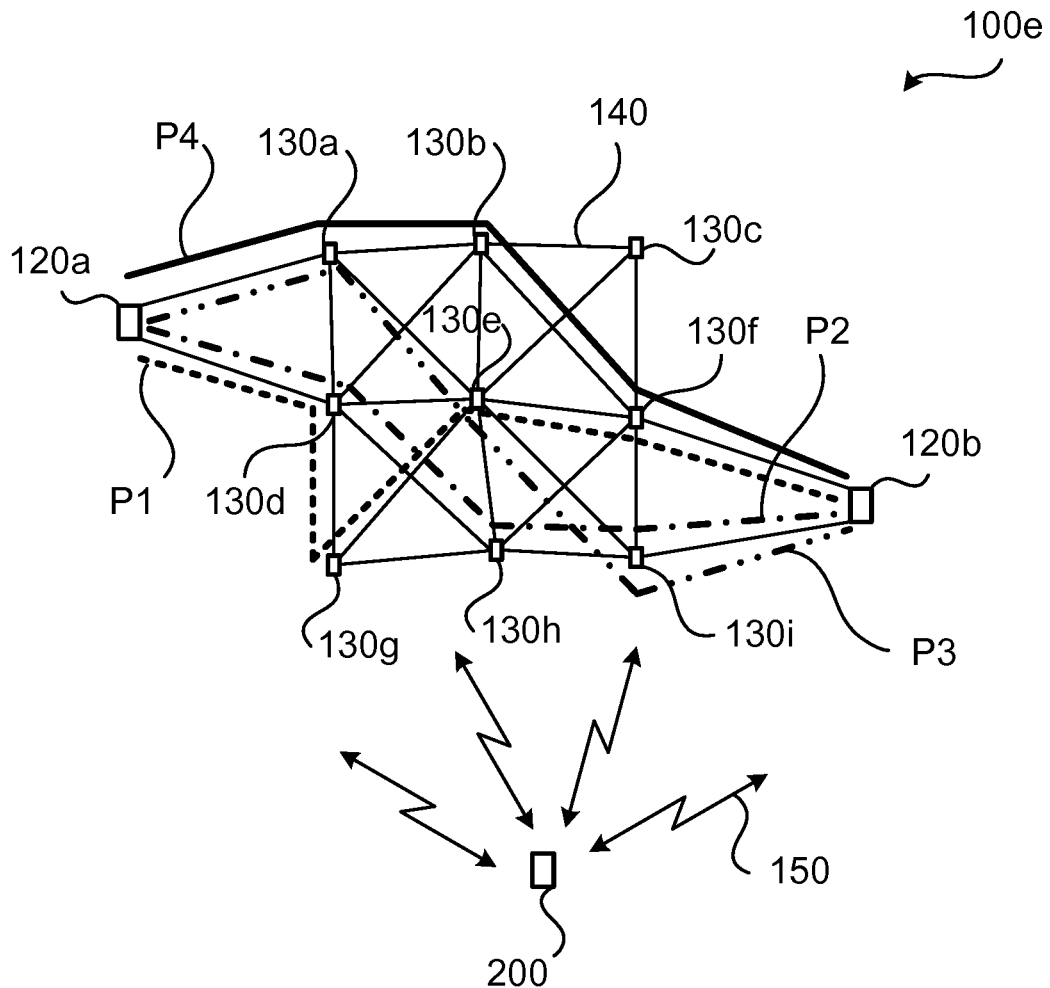
Figure 10:
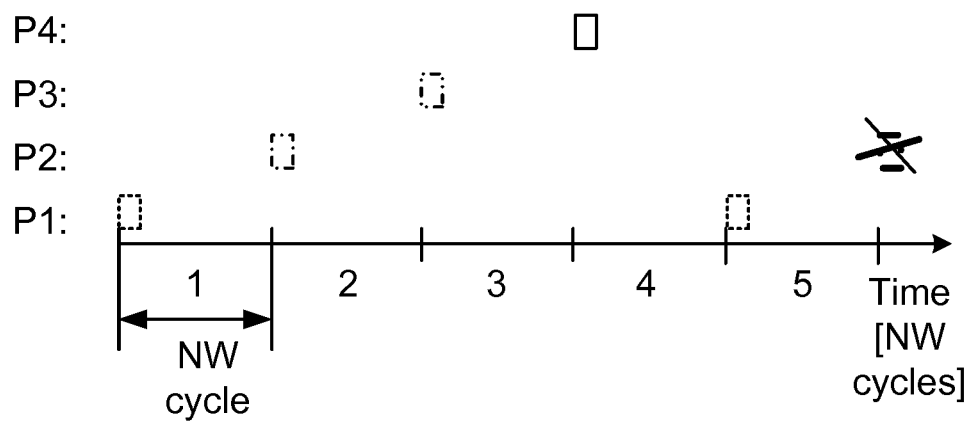

A third embodiment concerns redundancy using multiple non-redundant TSN communication links 140, instead of redundant TSN communication links 140 as in IEEE 802.1CB and is illustrated in FIG. 10, which illustrates a non-limiting example where four different TSN communication links 140 are used. FIG. 10 is a schematic diagram illustrating an industrial system 100*e* similar to that of FIG. 2 and comprises two end-points 120*a*, 120*b*, nine intermediate nodes 130*a*-130*i*, and one control node 200 configured to communicate with each other over TSN communication links 140 and communication links 150. The end-points 120*a*, 120*b* communicate with each other over paths P1, P2, P3, P4, where during the first five network cycles packets are successfully communicated over paths P1, P2, P3, P4, and P1, respectively, and where during the last the network cycle there is a failure at intermediate node 130*h* causing the packet communicated over path P2 to not be delivered (as indicated by the crossed-over packet in the bottom part of FIG. 10). In particularly, according to the third embodiment, respective non-duplicated packets are communicated between the two end-points 120*a*-120N on each of the TSN communication link 140 and the at least one further TSN communication link 140 before the failure of the TSN communication link 140 is detected in step S202. Then, during the self-healing in step S204, the packets communicated between the two end-points 120*a*-120N on the TSN communication link 140 for which failure has been detected in step S202 are dropped. This enables implicit self-healing. This embodiment explores the fact that many industrial control systems are enabled to handle loss of a certain number of consecutive packets without any serious malfunctioning. Packets are cyclically interleaved on the respective TSN communication links 140, in contrast to the first embodiment of using duplicated dual TSN communication links 140 with duplicate packet elimination according to IEEE 802.1CB.

The control node 200 might thus not just identify, determine, and/or select, a working reconfiguration for the whole TSN network 110, but also, in advance, find a complete set of network reconfiguration actions to be able to restore redundancy in case of any single point of failure, as defined by the failure of the TSN communication link 140, that could occur in the TSN network 110. The herein disclosed methods guarantee extra quick recovery (MTTR$_{logical}$) from a single point of failure without any human service action by ensuring there are network reconfigurations possibilities for any single point of failure, and ensuring these network reconfigurations will automatically be requested and deployed by the control node 200. The herein disclosed methods enable the TSN network 110 to automatically and quickly, without human intervention, reduce the MTTR by using also MTTR$_{logical}$ measures instead of just MTTR$_{physical}$ measures. The control node 200 might in advance identify, determine, and/or select a complete set of network reconfiguration actions to be able to restore redundancy in case of any dual point of failure that could occur in the TSN network 110.

As above, in some aspects service request with instructions regarding what maintenance is needed to restore the lost system functionality is sent. Hence, according to an embodiment the control node 200 is configured to perform step S206:

S206: The control node 200 issues a request for a maintenance service of the TSN communication link 140.

Figure 11:
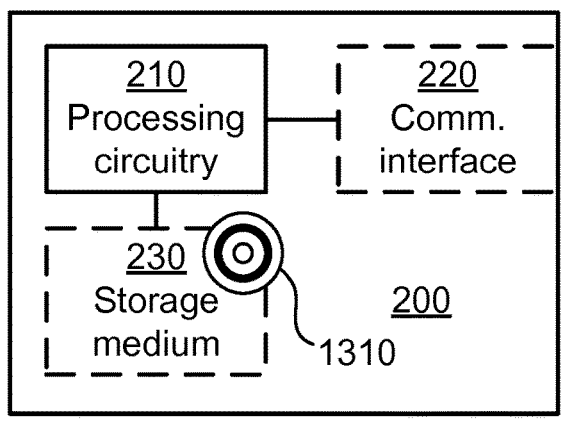
FIG. 11 is a schematic diagram showing functional units of a control node according to an embodiment.

FIG. 11 schematically illustrates, in terms of a number of functional units, the components of a control node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1310 (as in FIG. 13), e.g. in the form of a storage medium 230. The processing circuitry 210 may further be provided as at least one application specific integrated circuit (ASIC), or field programmable gate array (FPGA).

Particularly, the processing circuitry 210 is configured to cause the control node 200 to perform a set of operations, or steps, as disclosed above. For example, the storage medium 230 may store the set of operations, and the processing circuitry 210 may be configured to retrieve the set of operations from the storage medium 230 to cause the control node 200 to perform the set of operations. The set of operations may be provided as a set of executable instructions.

Thus, the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The control node 200 may further comprise a communications interface 220 at least configured for communications with other entities, functions, nodes, and devices of the network 110. As such the communications interface 220 may comprise one or more transmitters and receivers, comprising analogue and digital components. The processing circuitry 210 controls the general operation of the control node 200 e.g. by sending data and control signals to the communications interface 220 and the storage medium 230, by receiving data and reports from the communications interface 220, and by retrieving data and instructions from the storage medium 230. Other components, as well as the related functionality, of the control node 200 are omitted in order not to obscure the concepts presented herein.

Figure 12:
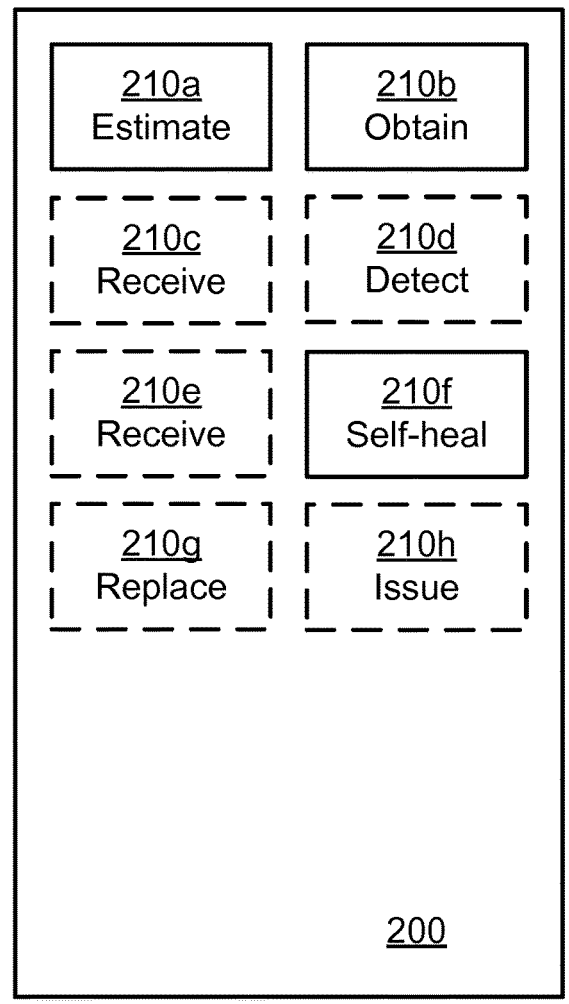
FIG. 12 is a schematic diagram showing functional modules of a control node according to an embodiment.

FIG. 12 schematically illustrates, in terms of a number of functional modules, the components of a control node 200 according to an embodiment. The control node 200 of FIG. 12 comprises a number of functional modules; an estimate module 210a configured to perform step S102, an obtain module 210b configured to perform steps S104, S202, and a self-heal module 210f configured to perform steps S106, S204. The control node 200 of FIG. 12 may further comprise a number of optional functional modules, such as any of a receive module 210c configured to perform step S104a, a detect module 210d configured to perform step S104b, a receive module 210e configured to perform step S104c, a replace module 210g configured to perform steps S106a, S204a, and an issue module 210h configured to perform steps S108, S206.

In general terms, each functional module 210a-210h may in one embodiment be implemented only in hardware and in another embodiment with the help of software, i.e., the latter embodiment having computer program instructions stored on the storage medium 230 which when run on the processing circuitry makes the control node 200 perform the corresponding steps mentioned above in conjunction with FIG. 12. It should also be mentioned that even though the modules correspond to parts of a computer program, they do not need to be separate modules therein, but the way in which they are implemented in software is dependent on the programming language used. Preferably, one or more or all functional modules 210a-210h may be implemented by the processing circuitry 210, possibly in cooperation with the communications interface 220 and/or the storage medium 230. The processing circuitry 210 may thus be configured to from the storage medium 230 fetch instructions as provided by a functional module 210a-210h and to execute these instructions, thereby performing any steps as disclosed herein.

The control node 200 may be provided as a standalone device or as a part of at least one further device. For example, the control node 200, or at least its functionality as herein disclosed, might be provided in a gateway 107 of an industrial system bow, mob configured for ABB ability services. Alternatively, functionality of the control node 200 may be distributed between at least two devices, or nodes. These at least two nodes, or devices, may either be part of the same network part or may be spread between at least two such network parts. As an example, a first part of the control node 200 having access to limited computational resources might be implemented on the premises of the industrial system 100a, 100b and perform only limited big-data analytics of timestamped event log entries, whilst a second part of the control node 200 having access to higher amounts of computational resource might be implemented in a computational cloud environment execute more unlimited big-data analytics of the timestamped event log entries. Thus, the first part of the control node 200 might act as a pre-processor for the second part of the control node 200, reducing the amount of data that has to be communicated to the second part of the control node 200. Further, the first part of the control node 200 might be configured by the second part of the control node 200. The first part of the control node 200 might be implemented to interface the second part of the control node 200 on one side and to interface a production, planning, and tracking system of the industrial system 100a, 100b and/or a control and operation system on another side.

Thus, a first portion of the instructions performed by the control node 200 may be executed in a first device (as defined by the first part of the control node 200), and a second portion of the of the instructions performed by the control node 200 may be executed in a second device (as defined by the second part of the control node 200); the herein disclosed embodiments are not limited to any particular number of devices on which the instructions performed by the control node 200 may be executed. Hence, the methods according to the herein disclosed embodiments are suitable to be performed by a control node 200 residing in a cloud computational environment 106. Therefore, although a single processing circuitry 210 is illustrated in FIG. 11 the processing circuitry 210 may be distributed among a plurality of devices, or nodes. The same applies to the functional modules 210a-210h of FIG. 12 and the computer program 1320 of FIG. 13.

Figure 13:
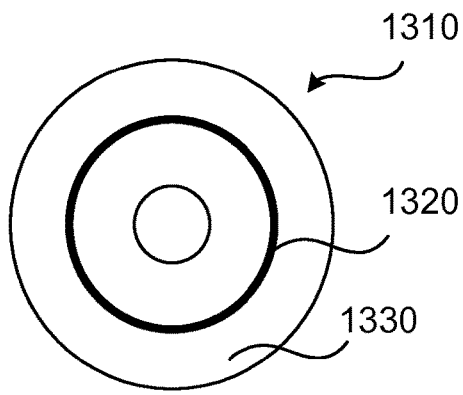
FIG. 13 shows one example of a computer program product comprising computer readable storage medium according to an embodiment.

FIG. 13 shows one example of a computer program product 1310 comprising computer readable storage medium 1330. On this computer readable storage medium 1330, a computer program 1320 can be stored, which computer program 1320 can cause the processing circuitry 210 and thereto operatively coupled entities and devices, such as the communications interface 220 and the storage medium 230, to execute methods according to embodiments described herein. The computer program 1320 and/or computer program product 1310 may thus provide means for performing any steps as herein disclosed.

In the example of FIG. 13, the computer program product 1310 is illustrated as an optical disc, such as a CD (compact disc) or a DVD (digital versatile disc) or a Blu-Ray disc. The computer program product 1310 could also be embodied as a memory, such as a random-access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320 is here schematically shown as a track on the depicted optical disk, the computer program 1320 can be stored in any way which is suitable for the computer program product 1310.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for handling failure of a Time-Sensitive Networking (TSN) communication link in a TSN network of an industrial system, the method being performed by a control node, the method comprising:
estimating requirements for TSN communication for end-points based on application parameters, input/output requirements, and application requirements, wherein each end-point is an industrial plant equipment and is capable of communicating over a TSN channel and a non-TSN channel in the TSN network using one and a same network interface;
obtaining an indication of a failure of a TSN communication link in the TSN network between two of the end-points, wherein obtaining the indication comprises at least one of:
receiving, from the non-TSN communication port of one of the end-points acting as listener, a multicast User Datagram Protocol, UDP, message, the UDP message indicating that the end-point acting as listener has detected that there is no reception of packets from one of the end-points acting as a talker; or
receiving, from the non-TSN communication port of one of the end-points acting as listener, a talker failure message, the talker failure message indicating impairment of an application at one of the end-points acting as a talker; and performing self-healing of the TSN communication link.

2. The method according to claim 1, wherein each end-point comprises a TSN communication port for TSN communication in the TSN network and a non-TSN communication port for non-TSN communication in the TSN network.

3. The method according to claim 1, wherein, during the estimating, process parameters are tagged for TSN based communication and non-TSN based communication.

4. The method according to claim 1, wherein, during the estimating, process parameters are tagged with application layer protocol information.

5. The method according to claim 1, wherein, during the estimating, the required TSN communication traffic for each end-point is estimated.

6. The method according to claim 2, wherein, as a result of obtaining the indication, the non-TSN communication port is deactivated when TSN communication occurs.

7. The method according to claim 1, wherein, during the self-healing, the control node acts as a Centralized User Configuration, CUC, entity in the TSN network.

8. The method according to claim 7, wherein the control node during the self-healing is configured to communicate with at least one Centralized Network Configuration, CNC, entity for coordinating and resolving the failure of the TSN communication link.

9. The method according to claim 1, wherein the TSN network further comprises intermediate nodes, wherein the TSN communication link extends between said two of the end-points via a first subset of the intermediate nodes, wherein at least one further TSN communication link extends between said two of the end-points via a second subset of the intermediate nodes, and wherein the first subset and the second subset are not identical.

10. The method according to claim 9, wherein duplicated packets are communicated between said two of the end-points on the TSN communication link and on the at least one further TSN communication link, and wherein performing the self-healing further comprises:
replacing the TSN communication link with yet a further TSN communication link extending between said two of the end-points via a third subset of the intermediate nodes, wherein the third subset is neither identical to the first subset nor identical to the second subset.

11. The method according to claim 9, wherein packets are communicated between said two of the end-points on the TSN communication link before detecting the failure of the TSN communication link, and wherein, during the self-healing, the packets are instead communicated between said two of the end-points on the at least one further TSN communication link.

12. The method according to claim 9, wherein respective non-duplicated packets are communicated between said two of the end-points on each of the TSN communication link and the at least one further TSN communication link before detecting the failure of the TSN communication link, and wherein, during the self-healing, the packets communicated between said two of the end-points on the TSN communication link are dropped.

13. The method according to claim 1, further comprising:
issuing a request for a maintenance service of the TSN communication link.

14. The method according to claim 1, wherein each TSN communication link is a wired communication link.

15. The method according to claim 1, wherein each end-point comprises a TSN communication port for TSN communication in the TSN network and a non-TSN communication port for non-TSN communication in the TSN network;
wherein in response to obtaining the indication of the failure, said two of the end-points use their respective non-TSN communication ports to initiate communication with the control node and other end-points to perform the self-healing autonomously.

16. The method according to claim 1, wherein said performing self healing comprises sending a request to a Centralized Network Configuration, CNC, entity for new network configuration.

17. A method for handling failure of a Time-Sensitive Networking (TSN) communication link in a TSN network of an industrial system, wherein the TSN network comprises end-points and intermediate nodes, wherein the end-points are industrial plant equipment, wherein a TSN communication link extends between two of the end-points via a first subset of the intermediate nodes, wherein at least one further TSN communication link extends between said two of the end-points via a second subset of the intermediate nodes, and wherein the first subset and the second subset are not identical, the method being performed by a control node, the method comprising:
  obtaining an indication of failure of the TSN communication link, wherein obtaining the indication comprises at least one of:
    receiving, from the non-TSN communication port of one of the end-points acting as listener, a multicast User Datagram Protocol, UDP, message, the UDP message indicating that the end-point acting as listener has detected that there is no reception of packets from one of the end-points acting as a talker; or
    receiving, from the non-TSN communication port of one of the end-points acting as listener, a talker failure message, the talker failure message indicating impairment of an application at one of the end-points acting as a talker; and performing self-healing of the TSN communication link.

18. The method according to claim 17, wherein duplicated packets are communicated between said two of the end-points on the TSN communication link and on the at least one further TSN communication link, and wherein performing the self-healing further comprises:
  replacing the TSN communication link with yet a further TSN communication link extending between said two of the end-points via a third subset of the intermediate nodes, wherein the third subset is neither identical to the first subset nor identical to the second subset.

19. The method according to claim 17, wherein packets are communicated between said two of the end-points on the TSN communication link before detecting the failure of the TSN communication link, and wherein, during the self-healing, the packets are instead communicated between said two of the end-points on the at least one further TSN communication link.

20. The method according to claim 17, wherein respective non-duplicated packets are communicated between said two of the end-points on each of the TSN communication link and the at least one further TSN communication link before detecting the failure of the TSN communication link, and wherein, during the self-healing, the packets communicated between said two of the end-points on the TSN communication link are dropped.

21. The method according to claim 17, further comprising:
  issuing a request for a maintenance service of the TSN communication link.

22. A control node for handling failure of a Time-Sensitive Networking, TSN, communication link in a TSN network, the control node including processing circuitry, the processing circuitry being configured to cause the control node to:
  estimate requirements for TSN communication for end-points based on application parameters, input/output requirements, and application requirements, wherein each end-point is capable of communicating over a TSN channel and a non-TSN channel in the TSN network using one and a same network interface;
  obtain an indication of a failure of a TSN communication link in the TSN network between two of the end-points, wherein obtaining the indication comprises at least one of:
    receiving, from the non-TSN communication port of one of the end-points acting as listener, a multicast User Datagram Protocol, UDP, message, the UDP message indicating that the end-point acting as listener has detected that there is no reception of packets from one of the end-points acting as a talker; or
    receiving, from the non-TSN communication port of one of the end-points acting as listener, a talker failure message, the talker failure message indicating impairment of an application at one of the end-points acting as a talker; and perform self-healing of the TSN communication link.

23. The control node according to claim 22, further being configured to perform a method having the following steps:
  estimating requirements for TSN communication for end-points based on application parameters, input/output requirements, and application requirements, wherein each end-point is capable of communicating over a TSN channel and a non-TSN channel in the TSN network using one and the same network interface;
  obtaining an indication of a failure of a TSN communication link in the TSN network between two of the end-points; and
  performing self-healing of the TSN communication link; and
  wherein each end-point comprises a TSN communication port for TSN communication in the TSN network and a non-TSN communication port for non-TSN communication in the TSN network.

24. A control node for handling failure of a Time-Sensitive Networking (TSN) communication link in a TSN network, wherein the TSN network comprises end-points and intermediate nodes, wherein a TSN communication link extends between two of the end-points via a first subset of the intermediate nodes, wherein at least one further TSN communication link extends between said two of the end-points via a second subset of the intermediate nodes, and wherein the first subset and the second subset are not identical, the control node including processing circuitry, the processing circuitry being configured to cause the control node to:
  obtain an indication of a failure of the TSN communication link, wherein obtaining the indication comprises at least one of:
    receiving, from the non-TSN communication port of one of the end-points acting as listener, a multicast User Datagram Protocol, UDP, message, the UDP message indicating that the end-point acting as listener has detected that there is no reception of packets from one of the end-points acting as a talker; or
    receiving, from the non-TSN communication port of one of the end-points acting as listener, a talker failure message, the talker failure message indicating impairment of an application at one of the end-points acting as a talker; and
  perform self-healing of the TSN communication link.

25. The control node according to claim 24, further being configured to perform a method having the following steps:

obtaining an indication of failure of the TSN communication link;
performing self-healing of the TSN communication link; and
wherein performing the self-healing further includes replacing the TSN communication link with yet a further TSN communication link extending between said two of the end-points via a third subset of the intermediate nodes, wherein the third subset is neither identical to the first subset nor identical to the second subset.

26. A computer program for handling failure of a Time-Sensitive Networking (TSN) communication link in a TSN network, the computer program including computer code which, when run on processing circuitry of a control node, causes the control node to:
 estimate requirements for TSN communication for end-points based on application parameters, input/output requirements, and application requirements, wherein each end-point is capable of communicating over a TSN channel and a non-TSN channel in the TSN network using one and a same network interface;
 obtain an indication of a failure of a TSN communication link in the TSN network between two of the end-points, wherein obtaining the indication comprises at least one of:
  receiving, from the non-TSN communication port of one of the end-points acting as listener, a multicast User Datagram Protocol, UDP, message, the UDP message indicating that the end-point acting as listener has detected that there is no reception of packets from one of the end-points acting as a talker; or
  receiving, from the non-TSN communication port of one of the end-points acting as listener, a talker failure message, the talker failure message indicating impairment of an application at one of the end-points acting as a talker; and perform self-healing of the TSN communication link.

27. A computer program product comprising a computer program according to claim 26, and a computer readable storage medium on which the computer program is stored.

28. A computer program for handling failure of a Time-Sensitive Networking (TSN) communication link in a TSN network, wherein the TSN network comprises end-points and intermediate nodes, wherein a TSN communication link extends between two of the end-points via a first subset of the intermediate nodes, wherein at least one further TSN communication link extends between said two of the end-points via a second subset of the intermediate nodes, and wherein the first subset and the second subset are not identical, the computer program including computer code which, when run on processing circuitry of a control node, causes the control node to:
 obtain an indication of a failure of the TSN communication link, wherein obtaining the indication comprises at least one of:
  receiving, from the non-TSN communication port of one of the end-points acting as listener, a multicast User Datagram Protocol, UDP, message, the UDP message indicating that the end-point acting as listener has detected that there is no reception of packets from one of the end-points acting as a talker; or
  receiving, from the non-TSN communication port of one of the end-points acting as listener, a talker failure message, the talker failure message indicating impairment of an application at one of the end-points acting as a talker; and perform self-healing of the TSN communication link.

* * * * *